United States Patent
Wang et al.

(10) Patent No.: US 7,129,986 B2
(45) Date of Patent: Oct. 31, 2006

(54) WIRELESS CAMERA SYSTEM

(76) Inventors: Guan-Wu Wang, 554 Hilbar La., Palo Alto, CA (US) 94303; Weiping Wang, 4044 Sutherland Dr., Palo Alto, CA (US) 94303

(*) Notice: Subject to any disclaimer, the term of this patent is extended or adjusted under 35 U.S.C. 154(b) by 676 days.

(21) Appl. No.: 10/302,305

(22) Filed: Nov. 22, 2002

(65) Prior Publication Data

US 2003/0137588 A1    Jul. 24, 2003

Related U.S. Application Data

(60) Provisional application No. 60/350,903, filed on Jan. 23, 2002.

(51) Int. Cl.
*H04N 5/225* (2006.01)
*G06K 9/22* (2006.01)

(52) U.S. Cl. ................... 348/376; 382/313

(58) Field of Classification Search ............ 348/211.2, 348/376, 373, 374, 375; 382/313, 314
See application file for complete search history.

(56) References Cited

U.S. PATENT DOCUMENTS

| | | | |
|---|---|---|---|
| 3,984,625 A | 10/1976 | Camras | |
| 4,136,361 A * | 1/1979 | Doan | 348/63 |
| 4,344,092 A * | 8/1982 | Miller | 348/331 |
| 4,516,157 A | 5/1985 | Campbell | |
| 5,247,137 A * | 9/1993 | Epperson | 178/19.04 |
| 5,712,679 A | 1/1998 | Coles | |
| 5,745,165 A * | 4/1998 | Atsuta et al. | 348/65 |
| 5,793,419 A | 8/1998 | Fraley | |
| 5,822,020 A | 10/1998 | Bargauan | |
| 5,903,322 A | 5/1999 | Chen | |
| 6,173,119 B1 | 1/2001 | Manico et al. | |
| 6,181,373 B1 | 1/2001 | Coles | |
| 6,310,988 B1 * | 10/2001 | Flores et al. | 382/313 |
| 6,330,976 B1 * | 12/2001 | Dymetman et al. | 235/487 |
| 6,522,352 B1 * | 2/2003 | Strandwitz et al. | 348/211.2 |
| 6,577,299 B1 * | 6/2003 | Schiller et al. | 345/179 |
| 6,667,771 B1 * | 12/2003 | Kweon | 348/373 |
| 6,806,868 B1 * | 10/2004 | Chuang | 345/179 |
| 6,943,843 B1 * | 9/2005 | Boyden et al. | 348/373 |
| 2002/0118279 A1 * | 8/2002 | Spoonhower et al. | 348/66 |
| 2003/0020807 A1 * | 1/2003 | Khoshnevis et al. | 348/42 |
| 2003/0107652 A1 * | 6/2003 | Williams | 348/207.99 |

\* cited by examiner

*Primary Examiner*—Ngoc-Yen Vu
*Assistant Examiner*—Richard M. Bemben
(74) *Attorney, Agent, or Firm*—Tran & Associates

(57) ABSTRACT

A wireless camera including an enclosure having a lens opening; an imaging sensor positioned toward the lens opening; memory coupled to the camera to receive image data from the imaging sensor; and a wireless transmitter coupled to the camera.

14 Claims, 1 Drawing Sheet

WIRELESS CAMERA SYSTEM

This application claims priority to Provisional Application Ser. No. 60/350,903, filed on Jan. 23, 2002 and entitled "Wireless Camera System with Compact Tubular Body and Integrated Antenna", the content of which is hereby incorporated by reference.

BACKGROUND

The present invention relates to a portable wireless imaging system.

As the popularity of digital cameras grows, the desire of digital camera users to share their images with others will also continue to grow. The best approaches to photo-sharing take advantage of the Internet. One such approach is for users to store the digital images on a PC and then send the images to others using email. Several Internet companies now offer an even more convenient approach by providing photo-sharing websites that allow users to store their images for free and to arrange the images into web-based photo albums. Once posted on a photo-sharing website, others may view the images over the Internet.

While convenient for storing digital images, getting the images to the photo-sharing websites can be challenging for users. Most commonly, users must upload their images from the digital camera to a PC using a cable or IrDA, or by inserting the camera's flash card into the PC. From the PC, the user logs onto the Internet and uploads the images to a photo-sharing website. After uploading the images, the user works on the website to arrange the images into web albums and to add any textual information.

U.S. Pat. No. 6,453,361 discussed an approach to uploading images to the web that does not require the use of a PC. In this approach, an email software application is loaded into a digital camera capable of running software that allows the user to e-mail the images directly from the camera. The user simply connects his or her digital camera to a cellphone or modem, runs the e-mail application, and selects the desired images and the email recipients. The selected images are then sent to the recipients as e-mail attachments.

U.S. Pat. No. 6,453,361 also disclosed a meta-application architecture for integrating photo-service-based websites. The online system includes a plurality of client devices capable of storing and displaying digital images, wherein a portion of the client devices communicate data in different formats. The system also includes a plurality of online photo-service sites, wherein each of the photo-service sites utilize different data models. The online system further includes a server for communicating with both the client devices and the photo-service sites over a network. A meta-application is also provided that is accessible by the server for defining a common data model format for the different formats of the photo-service sites. In operation, when a request is received from a client device for photo-services from a particular photo-service site, the request is passed to the photo-service site. When a response from the photo-service site is received, the response is converted from the data model of the photo-service site to the common data model format, and the converted request is then presented to the requesting client device in the data format required by the requesting client device.

Although emailing photos directly from the camera allows users who do not own a PC to share images over the Internet, these users must still establish accounts with both an Internet service provider (ISP) and the photo-sharing website before being able to post their images. Cameras are not designed for text entry, and the information required may be somewhat technical in nature. Consequently, establishing the accounts by entering account and configuration data on the digital camera itself may prove to be a difficult task for most users.

SUMMARY

A wireless camera including an enclosure having a lens opening; an imaging sensor positioned toward the lens opening; memory coupled to the camera to receive image data from the imaging sensor; and a wireless transmitter coupled to the camera.

Implementations of the above system may include one or more of the following. The enclosure is tubular shaped. A cap can be provided and adapted to be received by one end of the enclosure, the cap having an antenna mounted thereon. The imaging sensor is a CCD sensor. The memory is non-volatile memory. The transmitter is Bluetooth compatible, 802.11 compatible, or can communicate over a cellular channel. An antenna can be coupled to the transmitter. The antenna can be internal or external to the enclosure. A lens is positioned between the opening and the imaging sensor. The transmitter compresses the data prior to transmission. The data is JPEG compressed or MPEG compressed. When the camera is in use, the cap is removed from a lens end and attached to the other end of the enclosure and the antenna is electrically coupled to the transmitter for radio signal transmission. A processor can be provided with the memory for processing image data. A battery holder is positioned in the enclosure to receive a battery.

Advantages of the above system may include one or more of the following. The system is a compact system for taking video, static, or other encoded images and transmitting the results using radio frequency (RF) signals to a remote receiver for monitoring, recording, or interpretation purposes. The system includes a compact tubular body which houses a lens, an imaging device, a RF transmitter, a power source such as a battery, and an antenna. Another embodiment shapes the tubular body like a pen and the antenna mounted as a pen clip to make the system easy to carry and maneuver. The pen clip antenna can be positioned any where on the tubular body. In one another embodiment, the antenna as a pen clip can be mounted on the cap. Eliminating the recording media and mechanism, such as magnetic tapes or other memory devices, reduces the size of the camera and makes it easier to carry. The system is conveniently portable as the camera does not need to be physically connected to a recorder/monitor.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DESCRIPTION

Figure 1:
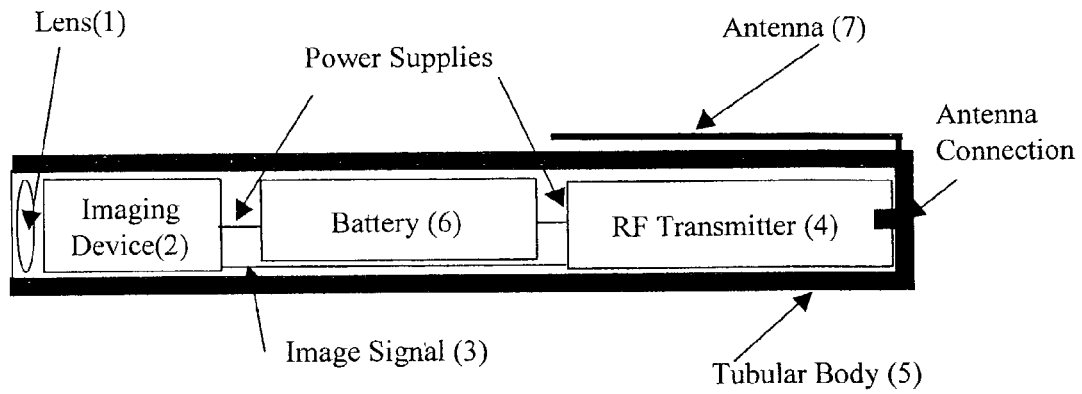
FIG. 1 shows an exemplary first embodiment of the system.

Referring now to the drawings in greater detail, there is illustrated therein structure diagrams for a display controller and logic flow diagrams for processes a system will utilize to wirelessly transmit images, as will be more readily understood from a study of the diagrams.

Figure 2:
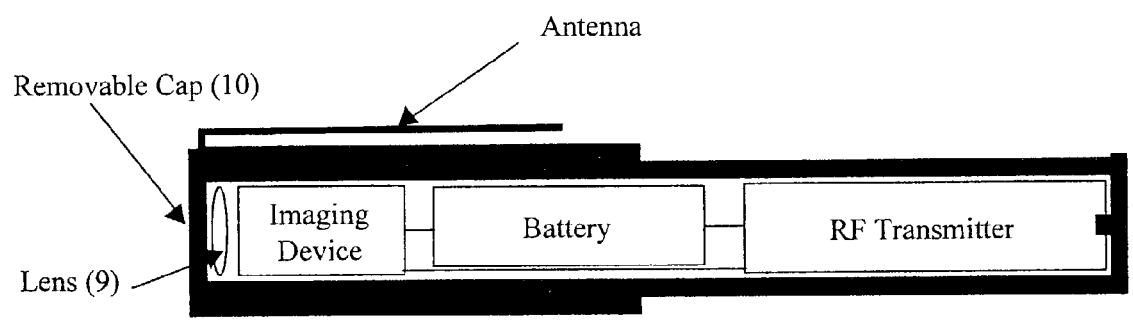
FIG. 2 shows the embodiment of FIG. 1 with a cap in the closed position.
Figure 3:
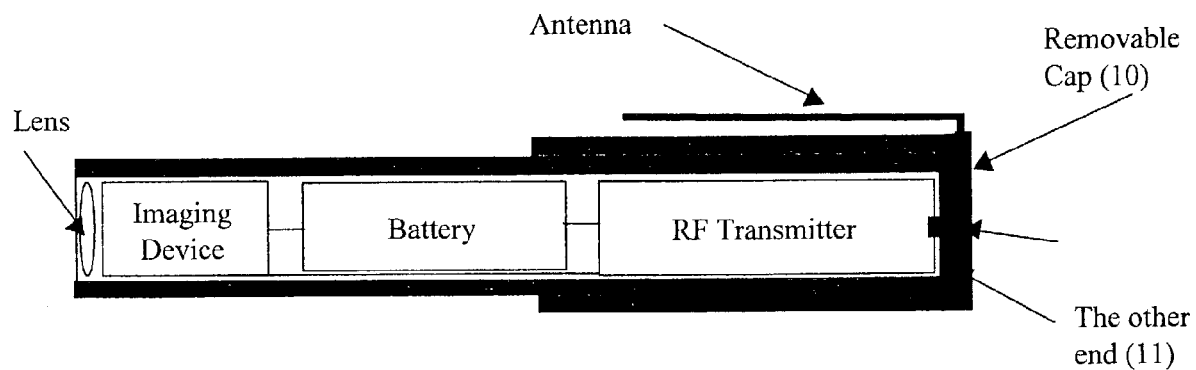
FIG. 3 shows the embodiment of FIG. 1 with a cap in the open or operating position.

FIG. 1 shows an exemplary first embodiment of the system, while FIG. 2 shows the embodiment of FIG. 1 with a cap in the closed position and FIG. 3 shows the exemplary cap in the open or operating position.

Referring now to FIG. 1, a tubular-shaped wireless camera system is shown. The camera includes a lens 1 and an imaging device 2. The lens can be mounted on one end of the device facing either in the axial or radial orientation. The signal from an imaging device could be in an analog form such as the video signal used in a TV, or in a digital form usable by computer, or other encoded formed. The image signal 3 is fed to a radio frequency (RF) transmitter 4.

The RF transmitter 4 includes a modulator, a frequency converter and an amplifier. It modulates the image signal with an oscillating frequency, and converts the frequency to radio frequency suitable for transmission, and finally amplifies the radio frequency for emission from an antenna 7. The RF transmitter 4 can be implemented on a single-chip integrated circuit (IC), which is small enough to fit inside the tubular body 5 of the system. The tubular can be made of insulating material such plastics to avoid interference with the function of the antenna. The RF transmitter can be either a Bluetooth® compatible network or an 802.11 compatible network. Bluetooth can establish wireless connections between devices such as mobile phones, PDAs, and headsets, operates at relatively low data rates over short distances using very little power. On the other hand, IEEE 802.11 is a wireless LAN standard approved by IEEE a couple years ago and operates at higher data rates over longer distances using more power. Alternatively, a cell-phone based modem or transmitter can be used.

The power for the camera and the RF transmitters is supplied by a battery 6. The battery can be renewed or recharged either externally or in the system connecting a DC power supply. Alternatively, power can be generated by a suitable solar cell on the outside of the body 5.

The tubular body 5 is a hollow cylinder. In one embodiment, the tubular body 5 can be shaped like a pen with a metal pen clip. The metal clip is dimensioned to serve as the antenna 7 of the transmitter. The pen clip antenna can be positioned any where on the tubular body. The pen could be styled to have a removable cap 10 at a first end 8. In one another embodiment, the antenna as a pen clip can be mounted on the cap 10. Moreover, the cap can be attached on the end of lens 9 to protect the lens when the system is not in use. When the camera is in use, the cap 10 is removed from the lens end and attached to the other end 11 of the tube. In this position, the antenna connection 12 of the RF transmitter becomes connected to the antenna for radio signal transmission.

The imaging device 2 can be a charge coupled device (CCD) which captures images associated with the pictures. The analog information can be encoded by the transmitter in analog form and transmitted. Alternatively, the transmission can be digital where a suitable analog to digital converter (ADC) receives and digitally converts the analog video information from the CCD. Suitable actuators can be provided to physically control camera settings. For example, the actuators can be connected to a shutter speed control unit which opens and closes for a predetermined time and a lens opening control unit for adjusting light levels to be received by the CCD. Further, a lens focusing unit can be used to automatically focus the images, based on information provided by one of the sensors. Further, the lens may be automatically switched with additional lens to provide zoom or panoramic view. Additionally, the lens 9 have one or optional filters to filter lights coming to the lens 9. Also, a flash unit can be used to sense and provide corrective actions during the snapping of the picture.

The above operations are controlled by a processor or an application specific integrated circuit (ASIC). In one embodiment, a processor is embedded and the processor can be a reduced instruction set computer (RISC) processor or a complex instruction set computer (CISC) processor. In one embodiment, the processor is a low power CPU such as the MC68328V DragonBall device available from Motorola Inc. The processor is connected to a read-only-memory (ROM) for receiving executable instructions as well as certain predefined data and variables. The processor is also connected to a random access memory (RAM) for storing various run-time variables and data arrays, among others. The RAM size is sufficient to store user application programs and data. In this instance, the RAM can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM for data back-up purposes.

The computer system receives instructions from the user via one or more switches such as push-button switches in a keypad. The processor is also connected to a real-time clock/timer that tracks time. The clock/timer can be a dedicated integrated circuit for tracking the real-time clock data, or alternatively, the clock/timer can be a software clock where time is tracked based on the clock signal clocking the processor. In the event that the clock/timer is software-based, it is preferred that the software clock/timer be interrupt driven to minimize the CPU loading. However, even an interrupt-driven software clock/timer requires certain CPU overhead in tracking time. Thus, the real-time clock/timer integrated circuit is preferable where high processing performance is needed.

During operation, camera parameters/settings are obtained from a photographer. These parameters include the zoom adjustment setting which causes the actuators to adjust its photographic instruments. Next, the routine proceeds to set instruments onboard the camera with the user entered parameters. If the shutter button has been depressed, the camera checks if the sensors indicate that camera settings need adjustments and/or the flash needs to be activated. If so, the camera settings are adjusted and power up a flash unit if necessary. Next, the camera shutter is opened and a frame data is captured by the CCD. The output of the CCD is digitized and compressed and transmitted. Compression of the data stream may be accomplished via a variety of imaging coding techniques such as JPEG, MPEG, vector quantization, a fuzzy vector quantization, or a fractal compression approach. Further, one skilled in the art can provide a channel coder to protect the data stream from the noise and the fading that are inherent in a radio channel.

Although tubular has been shown as an exemplary tubular body, the case may be of a number of variations of shape but can be conveniently made a rectangular, approaching a box-like configuration. For example, in another embodiment, instead of using a tubular body, a wrist-band such as a wristwatch strap of plastic, leather or woven material can be used. The wrist-band can contain an antenna for transmitting or receiving radio frequency signals. The wristband and the antenna inside the band are mechanically coupled to the top and bottom sides of the tubular body. Further, the antenna is electrically coupled to a radio frequency transmitter and receiver for wireless communications with another computer or another user. Although a pen and a wrist-band is disclosed, a number of substitutes may be used, including a belt, a ring holder, a brace, or a bracelet, among other suitable substitutes known to one skilled in the art.

It is to be understood that various terms employed in the description herein are interchangeable. Accordingly, the above description of the invention is illustrative and not limiting. Further modifications will be apparent to one of ordinary skill in the art in light of this disclosure.

The invention has been described in terms of specific examples which are illustrative only and are not to be construed as limiting. The invention may be implemented in digital electronic circuitry or in computer hardware, firmware, software, or in combinations of them.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, although exemplary embodiments using Bluetooth, 802.11, GSM, GPRS, and EDGE are contemplated, the invention is applicable to other forms of data transmission, include radio-based and optical-based transmission techniques.

Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs) or suitably programmed field programmable gate arrays (FPGAs).

While the preferred forms of the invention have been shown in the drawings and described herein, the invention should not be construed as limited to the specific forms shown and described since variations of the preferred forms will be apparent to those skilled in the art. Thus the scope of the invention is defined by the following claims and their equivalents.

What is claimed is:

1. A wireless camera, comprising:
   a. an enclosure having a lens opening at a first end of the enclosure;
   b. a cap to be received at a second end of the enclosure during operation;
   c. an imaging sensor positioned toward the lens opening;
   d. memory coupled to the camera to receive video image data from the imaging sensor;
   e. a radio frequency wireless transmitter coupled to the camera to transmit the video image data; and
   f. a pen-clip mounted on the enclosure and electrically connected to the wireless transmitter to act as an antenna; wherein when the camera is in use, the cap is removed from the first end and attached to the second end of the enclosure and when the cap is attached to the second end of the enclosure, the antenna is electrically coupled to the transmitter for radio signal transmission.

2. The wireless camera of claim 1, wherein the pen-clip is mounted on the cap.

3. The wireless camera of claim 1, wherein the enclosure is tubular shaped.

4. The wireless camera of claim 1, wherein the imaging sensor is a CCD sensor.

5. The wireless camera of claim 1, wherein the memory is non-volatile memory.

6. The wireless camera of claim 1, wherein the transmitter is Bluetooth or 802.11 compatible.

7. The wireless camera of claim 1, wherein the transmitter communicates over a cellular channel.

8. The wireless camera of claim 1, further comprising a lens positioned between the opening and the imaging sensor.

9. The wireless camera of claim 1, wherein the transmitter compresses the data prior to transmission.

10. The wireless camera of claim 9, wherein the data is JPEG compressed.

11. The wireless camera of claim 9, wherein the data is MPEG compressed.

12. The wireless camera of claim 1, wherein the cap is cylindrical.

13. The wireless camera of claim 1, further comprising a processor coupled to the memory for processing image data.

14. The wireless camera of claim 1, further comprising a battery holder positioned in the enclosure to receive a battery.

\* \* \* \* \*